United States Patent
Yi et al.

(10) Patent No.: US 8,775,804 B2
(45) Date of Patent: Jul. 8, 2014

(54) MATCHING AUTHENTICATION METHOD, DEVICE AND SYSTEM FOR WIRELESS COMMUNICATION

(75) Inventors: Xiaogang Yi, Changsha (CN); Yonghong Liu, Changsha (CN); Yaohui Ou, Changsha (CN); Jihui Zhou, Changsha (CN)

(73) Assignee: Sany Heavy Industry Co., Ltd., Hunan (CN)

( * ) Notice: Subject to any disclaimer, the term of this patent is extended or adjusted under 35 U.S.C. 154(b) by 294 days.

(21) Appl. No.: 13/001,747

(22) PCT Filed: Jun. 23, 2009

(86) PCT No.: PCT/CN2009/072401
§ 371 (c)(1),
(2), (4) Date: Feb. 16, 2011

(87) PCT Pub. No.: WO2010/000181
PCT Pub. Date: Jan. 7, 2010

(65) Prior Publication Data
US 2011/0191833 A1    Aug. 4, 2011

(30) Foreign Application Priority Data
Jul. 2, 2008 (CN) .......................... 2008 1 0127641

(51) Int. Cl.
H04L 29/06 (2006.01)
H04L 9/00 (2006.01)

(52) U.S. Cl.
USPC .......... 713/168; 713/169; 713/170; 713/171; 713/172; 713/173; 726/3; 726/4; 726/5; 726/6; 726/7

(58) Field of Classification Search
USPC ....................................... 713/168
See application file for complete search history.

(56) References Cited

U.S. PATENT DOCUMENTS

| | | | |
|---|---|---|---|
| 7,305,090 B1 * | 12/2007 | Hayes et al. ................... | 380/249 |
| 2005/0113070 A1 * | 5/2005 | Okabe ........................... | 455/411 |
| 2005/0225428 A1 | 10/2005 | Autret et al. | |
| 2008/0140160 A1 * | 6/2008 | Goetz et al. ..................... | 607/60 |

FOREIGN PATENT DOCUMENTS

CN    1549637 A    11/2004
(Continued)

OTHER PUBLICATIONS

Extended European Search Report for EP 09771951.2 dated Feb. 24, 2012, 8 pages.

*Primary Examiner* — Longbit Chai
(74) *Attorney, Agent, or Firm* — Kilpatrick Townsend & Stockton LLP

(57) ABSTRACT

A matching authentication method for wireless communication equipment comprises that: a device at the transmitting end sends a matching request (S101) to a device at the receiving end; the device at the transmitting end receives the response messages feedback from the device at the receiving end, and the response message carry with feature codes (S102); the device at the transmitting end obtains the feature codes and takes the feature codes as the authentication and authorization codes communicating with the receiving end. The invention also provides a wireless communication device with the function of matching authentication correspondingly. The wireless communication device comprises a memory unit, a communication unit, and an authentication and authorization unit and a feature code updating unit. The invention also provides a wireless communication system with the function of matching authentication correspondingly.

21 Claims, 2 Drawing Sheets

(56) References Cited

FOREIGN PATENT DOCUMENTS

| CN | 1575563 A | 2/2005 |
| CN | 1592449 A | 3/2005 |
| CN | 101309436 A | 11/2008 |
| EP | 1 801 762 A2 | 6/2007 |

\* cited by examiner

“Match authentication method, device and system for wireless communication devices”, which is hereby incorporated by reference in its entirety.

MATCHING AUTHENTICATION METHOD, DEVICE AND SYSTEM FOR WIRELESS COMMUNICATION

CROSS-REFERENCES TO RELATED APPLICATIONS

This present application claims priority to PCT/CN2009/072401 filed Jun. 23, 2009 which claims priority to Chinese Patent Application no. 200810127641.8, filed with the Chinese Patent Office on Jul. 2, 2008 and entitled "Match authentication method, device and system for wireless communication devices", which is hereby incorporated by reference in its entirety.

FIELD OF THE INVENTION

The present invention relates to the filed of wireless communications and in particular to a match authentication method, device and system for wireless communication devices.

BACKGROUND OF THE INVENTION

Numerous large engineering mechanical products, e.g., a concrete pump truck, a crane, etc., are typically equipped with a wireless control signal receiver and thus remotely controllable by a remote controller. Along with the increasing number of electronic devices controllable by a remote controller, such a situation may occur that a nearby electronic device using the same code system will be initiated or mis-operated by another remote controller, thus resulting in a fatal security accident. For example, several pump trucks operate at the same site, and if remote controller and receivers of the respective pump trucks are not strictly one-to-one correspondence relationships, then such a situation may occur that one of the remote controllers will be operated to improperly make cantilevers of the pump trucks act concurrently. This apparently tends to cause a fatal security accident.

There are already solutions to this problem: 1. each pair of a remote controller and a receiver of an electronic device is assigned with a specific identification signal (hereinafter referred to a feature code), so the remote controller can control only the electronic device with the same feature code. However, in this solution, the feature code is required to be cured in both the remote controller and the receiver of the device by complex operations of hardening the feature code, and the feature code registered in the electronic device and the remoter controller is typically fixed and not convenient in use to modify. Thus, if the remote controller is lost, then the device can not be used, which means poor interchangeability of devices; 2. a universal remote controller is used, and a cipher key is added so that the feature code in the cipher key and in the receiver of the electronic device is in one-to-one correspondence. Although this method address the problem of poor interchangeability of remote controllers, the feature code has also to be cured in both the cipher key and the receiver of the device by complex operations of hardening the feature code. If the cipher key is loss or not taken along, then the device can not be used. Furthermore, this solution requires to add a device (a cipher key), thus resulting in a consequential increased cost.

SUMMARY OF THE INVENTION

The invention provides a match authentication method, device and system for a wireless communication device, which can make a wireless controller correspond uniquely to a controlled device to secure an operation control and accommodate interchangeability of controller devices.

An embodiment of the invention provides a match authentication method for a wireless communication device, which includes:

transmitting a match request from a transmitting terminal device to a receiving terminal device;

receiving, by the transmitting terminal device, a response message fed back from the receiving terminal device, wherein the response message carries a feature code; and acquiring, by the transmitting terminal device, the feature code as an authorization authentication code for communication with the receiving terminal device.

Preferably, the response message further carries a communication parameter for communication between the transmitting terminal device and the receiving terminal device, wherein the communication parameter includes a carrier frequency and/or bit rate of communication.

Preferably, an initial value of the feature code is pre-stored in the receiving terminal device and the feature code includes a serial number and a maintenance running number of the device.

Preferably, the receiving terminal device updates the feature code in the receiving terminal device upon reception of the match request transmitted from the transmitting terminal device, and the updated feature code is used in ongoing match authentication; or the feature code in the receiving terminal device is updated at the end of each match authentication for use in subsequent matching.

Preferably, the transmitting terminal device and the receiving terminal device perform wired communication during match authentication.

An embodiment of the invention provides a match authentication method for a wireless communication device, which includes:

receiving a match request message from a radio controller to a receiver, wherein the match request message carries a feature code;

acquiring, by the receiver, the feature code and using the feature code for authorization authentication with the wireless controller; and receiving, by the receiver, a control command from the wireless controller after authorization authentication is passed.

Preferably, the match request message further carries a communication parameter which comprises a carrier frequency and/or bite rate of communication, and the wireless controller uses the communication parameter for communication with the receiver.

An initial value of the feature code is pre-stored in the wireless controller and the feature code includes a serial number and a maintenance running number of the wireless controller.

Preferably, the wireless controller and the receiver perform match authentication in a wired communication manner.

An embodiment of the invention provides a wireless communication device capable of match authentication, which includes:

a storage unit adapted to store a feature code;

a communication unit adapted to transmit the feature code to an opposite device in response to a request and receive a request or command from the opposite device; and an authorization authentication unit adapted to use the feature code to perform authentication with the opposite device.

An embodiment of the invention provides a wireless communication system capable of match authentication, which includes a transmitting terminal device and a receiving terminal device, the transmitting terminal device interacts with the receiving terminal device to determine a feature code for authorization authentication;

the receiving terminal device performs authorization authentication for the transmitting terminal device by the feature code prior to communication; and the transmitting terminal device and the receiving terminal device communicate upon passing authorization authentication.

In summary, in the technical solutions according to the embodiments of the invention, the feature code can be cured in only one of the remote controller and the receiver and then transmitted to the other one over a wired connection for authentication to thereby simplify hardening of the feature code and perform conveniently and securely connection authentication between wireless devices; and match authentication can be performed to achieve one-to-one correspondence between the wireless remote controller and the controlled device to thereby avoid the remote operation from interfering with a ambient similar device.

Since the registered feature code can be automatically updated for subsequent match authentication, it can be ensured uniqueness of the feature code for each match authentication to thereby perform simply and conveniently new match authentication. A universal device can act as the part in which the feature code is not cured, thus implementing a high interchangeability. If the feature code is pre-cured on the receiver of the device, then the original remote controller in the case of being lost will just be replaced with a new universal remote controller, and the remote controller will be interfaced to the receiver of the device in which the feature code is cured to perform new match authentication to thereby setup connection communication between the new remote controller and the device, thus replacing the remote controller.

DETAILED DESCRIPTION OF THE INVENTION

The invention provides a method for match authentication between wireless devices, which can perform connection authentication between the wireless devices conveniently and securely and can avoid a wireless remote control from misoperating or interfering an ambient similar device while ensuring interchangeability between a wireless remote controller and a receiver.

According to the invention, firstly a match authentication between a remote controller and a receiver of a remote control device are performed prior to operation of the remote control device.

A feature code can be pre-stored in the remote controller or the receiver. The remoter controller and the receiver interact to determine the feature code and use the feature code for authorization authentication. During the match authentication, the remote controller and the receiver communicate in a wired way (e.g., over CAN bus).

Furthermore, a bit rate and a frequency band for communication between the remote controller and the receiver (arranged on a controlled device) can also be prescribed, thus avoiding actively interference from the ambient same signal.

Figure 1:
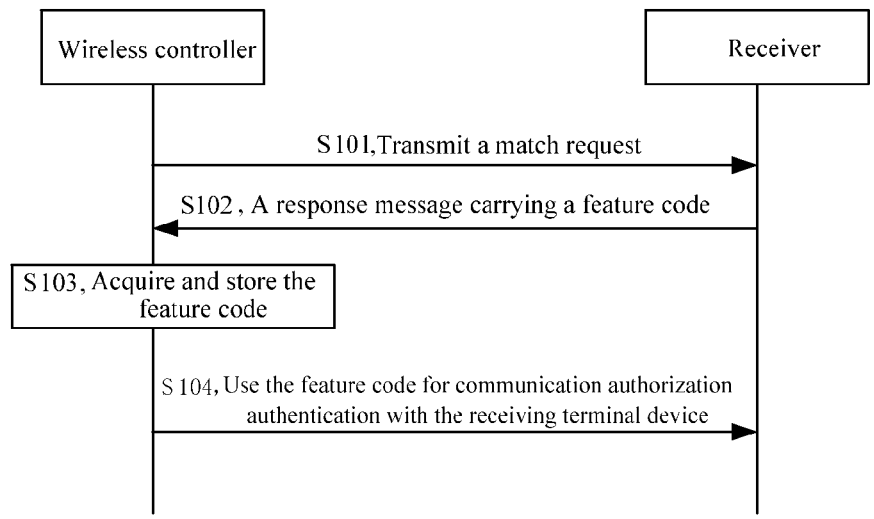
FIG. 1 is a flow chart of a match authentication method for a wireless communication device according to an embodiment of the invention.

In an embodiment of the invention, a receiver is arranged on a controlled device (e.g., a crane) to receive a command transmitted from a wireless controller and forward the command to a control processing unit of the device, thus performing a control operation on the controlled device. As illustrated in FIG. 1, an embodiment of the invention provides a method for match authentication between wireless communication devices, which includes:

S101. A wireless controller transmits a match request to a receiver;

S102. The wireless controller receives a response message which feeds back from the receiver and carries a feature code; and An initial feature of the feature code is pre-stored in the receiving terminal device, and the feature code includes a serial number and a maintenance sequential number of the device.

S103. The wireless controller acquires and stores the feature code;

The wireless controller stores the feature code for use in subsequent communication authorization authentication after acquiring the feature code.

In the present embodiment, the receiver updates the feature code in the receiving terminal device upon reception of the match request transmitted from the wireless controller, and the updated feature code is for use in ongoing match authentication; or The feature code in the receiving terminal device is updated at the end of each match authentication for use in subsequent matching.

Figure 2:
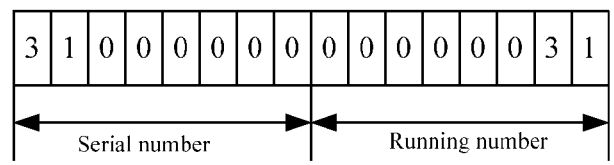
FIG. 2 is a schematic diagram of a structure of a feature code used in the embodiment of the invention.

As illustrated in FIG. 2, the feature code is composed of data with eight bytes, for example, where the first four bytes represent a serial number (SN code) of the device, and the last four bytes represent an internal maintenance running number of the device. In this respect, the running number is set initially to 31; and each time a different corresponding device is matched, the running number increased automatically by one to ensure uniqueness of the feature code and further prepare for subsequent matching. Since the serial number of the device is fixed, the number of times that the device can be matched is approximately four billion, which is sufficient for the device to be authenticated for match.

The response message further carries a communication parameter including a carrier frequency and/or bite rate of communication. The wireless controller communicates with the receiver by using the communication parameter.

S104. The wireless controller uses the feature code for communication authorization authentication with the receiver.

During match authentication, the wireless controller and the receiver perform wired communication.

In an embodiment of the invention, a wired connection is performed over a Controller Area Network (CAN) bus so that the wireless controller and the receiver are connected over the CAN bus and relevant information including the feature code, etc., is transmitted in a differential signal of the CAN bus to perform stable and reliable communication. The unique feature code is determined between the wireless controller and the receiver as an authorization authentication code of wireless communication therebetween to thereby ensure a unique relationship between the wireless controller and the receiver.

A CAN interface is configured on both the wireless controller and the receiver, which is a field bus adapted for various process detection and control. Data over the CAN interface is structured in a short frame with eight significant bytes to thereby offer a CRC check and other detection measures as well as a corresponding error handling function, achieve an insignificant data error ratio and ensure reliable data communication. A communication medium of the CAN bus adopts a cheap twisted pair, coaxial cable, etc., and a user interface is simple and easy to implement. CAN bus protocol has been certified by International Standardization Organization, and its technologies are rather matured. A control chip of the CAN bus has been commercialized with a high performance-price ratio.

The receiver uses the feature code for authorization authentication with the wireless controller prior to communication;

The wireless controller communicates with the receiver after authorization authentication is passed.

It shall be noted that in another embodiment, the feature code can alternatively be pre-stored in the wireless controller and transmitted to the receiver to perform authorization authentication using the determined feature code during match authentication.

Furthermore, the communication parameter (including a carrier frequency and/or bit rate of communication) can alternatively be set at the wireless controller and then notified to the receiver for use in subsequent communication.

At the end of each match authentication, the receiver updates the feature code, for example, by increasing the running number by one, to generate and store a new feature code for use in subsequent matching.

It shall further be noted that the receiver can alternatively update the feature code prior to each matching, specifically:

The feature code is updated and stored upon reception of the match request transmitted from the remote controller, and the original running number is increased by one to generate a new feature code, which is in turn used to perform ongoing matching.

Figure 3:
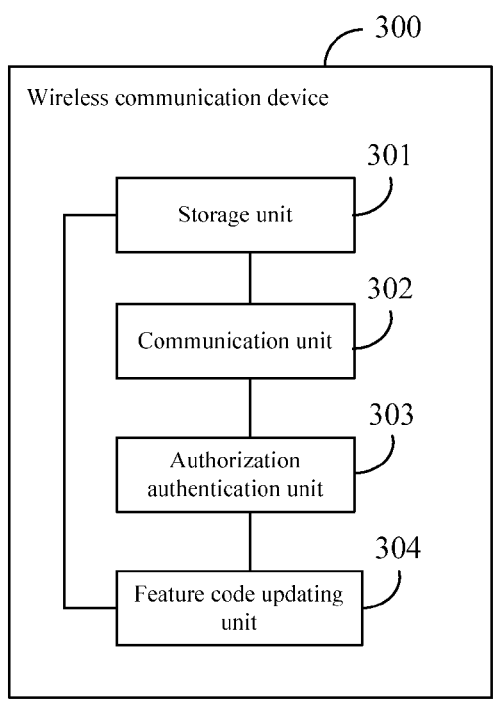
FIG. 3 is a schematic diagram of a structure of a wireless communication device capable of match authentication according to an embodiment of the invention.

An embodiment of the invention further provides a wireless communication device capable of match authentication as illustrated in FIG. 3, where the wireless communication device 300 includes:

A storage unit 301 adapted to store a feature code;

A communication unit 302 adapted to transmit the feature code to an opposite device in response to a request and to receive a request or command from the opposite device;

An authorization authentication unit 303 adapted to use the feature code to perform authentication with the opposite device;

Particularly, the feature code includes a serial number and a maintenance running number of the wireless communication device;

The wireless communication device 300 further includes:

A feature code updating unit 304 adapted to update the feature code;

At the end of each matching, the feature code updating unit increases the running number by one to generate a new feature code and transmit it to the storage unit 301 for storage in order for use in subsequent matching.

A CAN bus interface is arranged on the wireless communication device over which the wireless communication device and the opposite device are connected to perform match authentication.

Figure 4:
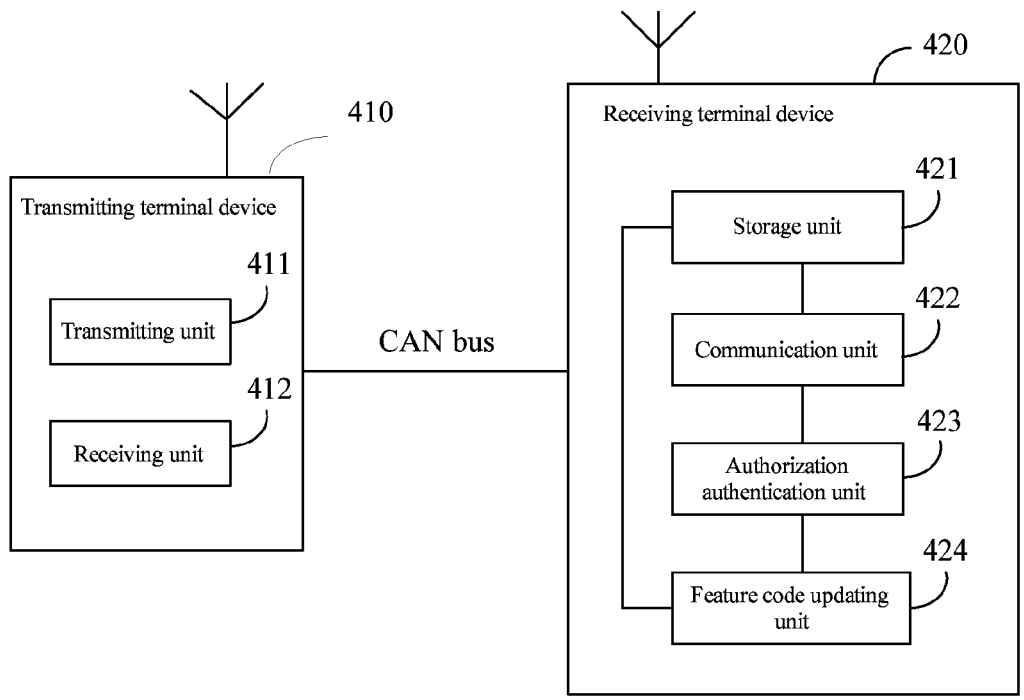
FIG. 4 is a schematic diagram of a structure of a wireless communication system capable of match authentication according to an embodiment of the invention.

An embodiment of the invention further provides a wireless communication system capable of match authentication as illustrated in FIG. 4, where the wireless communication system includes a transmitting terminal device 410 and a receiving terminal device 420, particularly:

The transmitting terminal device 410 includes a transmitting unit 411 and a receiving unit 412;

The receiving terminal device 420 includes:

A storage unit 421 adapted to store a feature code;

A communication unit 422 adapted to transmit the feature code to an opposite device in response to a request and to receive a request or command from the opposite device;

An authorization authentication unit 423 adapted to use the feature code to perform authentication with the opposite device.

Particularly, the feature code includes a serial number and a maintenance running number of the wireless communication device;

A feature code updating unit 424 is adapted to update the feature code.

The transmitting terminal device 410 and the receiving terminal device 420 interact to determine the feature code for authorization authentication, particularly:

The transmitting terminal device 410 transmits a match request to the receiving terminal device 420;

The transmitting terminal device 410 receives a response message which is fed back from the receiving terminal device 420 and carries the feature code to acquire the feature code;

The receiving terminal device 420 uses the feature code for authorization authentication with the transmitting terminal device 410 prior to communication;

The transmitting terminal device 410 communicates with the receiving terminal device 420 after authorization authentication is passed.

The transmitting terminal device 410 and the receiving terminal device 420 perform wired communication during match authentication.

The transmitting terminal device 410 and the receiving terminal device 420 are connected over a Controller Area Network (CAN) communication bus.

An initial value of the feature code is pre-stored in the transmitting terminal device 410 or the receiving terminal device 420, and the feature code includes a serial number and a maintenance running number of the transmitting terminal device 410 or the receiving terminal device 420.

A particularly application solution of the invention will be described below taking a remote control system of a cantilever of a concrete pump truck as an example. In an embodiment, a feature code is composed of a Serial Number (SN) and a maintenance running number of a device to be matched. The serial number is a unique product code set by a manufacturer of the device, but if the serial number alone is used as the feature code, then the device and another different device in match will have the same feature code, thus resulting in disordered matching between the devices. Therefore, the maintenance running number of the device is added in the feature code. It is set initially as 31 and upon each successful matching, increased by one to generate a new feature code, thereby avoiding any duplicate feature code.

The remote control system of the cantilever of the concrete pump truck includes an operation control unit and a receiver which is adapted to receive a command transmitted from a wireless remote controller and forward the command to the operation control unit to thereby perform a control operation on the concrete pump truck. Based upon the foregoing method for generating a unique feature code, a specific feature code is cured in a dedicated receiver paired with each pump truck, and during match authentication, the remote controller and the receiver are connected over a CAN bus for communication, and the feature code stored on the receiver is transmitted to a universal remote controller. Successful matching is determined after two handshakes.

Figure 5:
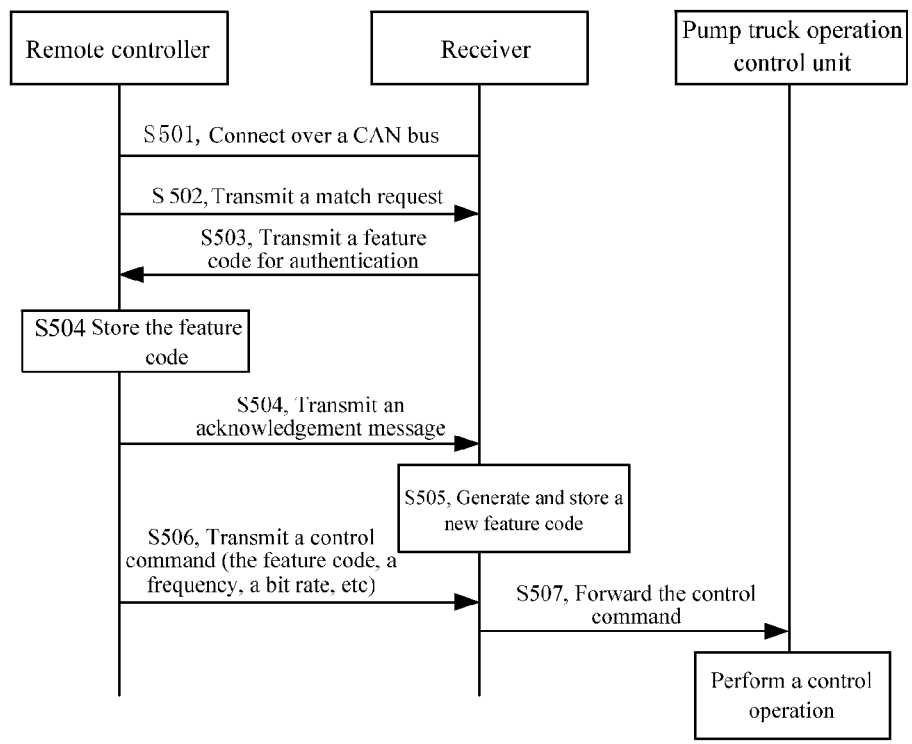
FIG. 5 is a schematic diagram of a flow of performing match authentication in a particular application example of the invention.

Referring to FIG. 5, a match authentication flow particularly includes:

S501. The remote controller and the receiver are connected over the CAN bus;

A CAN bus interface on the remote controller and that on the receiver are connected over the CAN bus.

S502. A match request button on the remote controller is pressed to transmit a match request to the receiver;

S503. The receiver transmits the feature code to the remote controller upon reception of the request;

S504. The remote controller stores the feature code automatically upon reception thereof and transmits an acknowledgement message to the receiver;

An indicator lamp on the remote controller is lightened to indicate successful authentication, thus finishing match authentication; or if no feature code for authentication is received, then the indicator lamp on the remote controller is inoperative, and at this time it is necessary to check a wiring condition, and the match request button on the remote controller is pressed again for another authentication until successful authentication.

S505. Upon successful authentication, the running number is increased by one to generate and store a new feature code for use in subsequent match authentication;

Furthermore, a communication parameter including a carrier frequency and/or bit rate of communication can further be set during match authentication, for example, by setting the communication parameter and transmitting it to the receiver through the remote controller.

S506. In a subsequent operation control, the remote controller uses the communication parameter to communicate with the receiver and transmit a control command to the receiver;

S507. The receiver receives the command transmitted from the remote controller and forwards the command to the operation control unit to thereby perform a control operation on the concrete pump truck.

In summary, in the technical solutions according to the embodiments of the invention, the feature code can be cured in only one of the remote controller and the receiver and then transmitted over a wired connection to the other one for authentication to thereby simplify hardening of the feature code and perform conveniently and securely connection authentication between wireless devices.

One-to-one correspondence can be achieved between the wireless remote controller and the controlled device to avoid the remote operation from interfering with an ambient similar device, and a universal device can act as the one of them without any feature code.

Since the feature code registered on the device is modifiable, it can perform match authentication again with a new remote controller in the event that the original remote controller is lost, thereby achieving good interchangeability.

Those skilled in the art can appreciate that all or a part of the modules or the respective steps in the foregoing embodiments can be performed by a program instructing relevant hardware, which can be stored in a computer readable storage medium, e.g., an ROM/RAM, a magnetic disk, an optical disk, etc. Alternatively, they can be can be implemented by being fabricated respectively as respective integrated circuit modules or a plurality of modules or steps among them can be implemented by being fabricated as a single integrated circuit module. Thus, the embodiments of the invention will not be limited to any particular combination of hardware and software.

The foregoing embodiments serve to illustrate and explain the principle of the invention. As can be appreciated, the embodiments of the invention will not be limited thereto. Various modifications and variations that can be made by those skilled in the art without departing from the spirit and scope of the invention shall come into the scope of the invention. Accordingly, the scope of the invention shall be as defined in the appended claims.

The invention claimed is:

1. A match authentication method for a wireless communication device, comprising:
   transmitting a match request from a transmitting terminal device to a receiving terminal device;
   receiving, by the transmitting terminal device, a response message fed back from the receiving terminal device, wherein the response message carries a feature code; and
   acquiring, by the transmitting terminal device, the feature code as an authorization authentication code for communication with the receiving terminal device,
   wherein an initial value of the feature code is pre-stored in the receiving terminal device, the feature code comprises a serial number and a maintenance running number of the receiving terminal device, and the serial number of the receiving terminal device is fixed.

2. The method according to claim 1, wherein:
   the response message further carries a communication parameter for communication between the transmitting terminal device and the receiving terminal device, wherein the communication parameter comprises a carrier frequency and/or bit rate of communication.

3. The method according to claim 1, further comprising:
   updating, by the receiving terminal device, the feature code in the receiving terminal device upon reception of the match request transmitted from the transmitting terminal device and using the updated feature code in ongoing match authentication; or
   updating the feature code in the receiving terminal device at the end of each match authentication for use in subsequent matching.

4. The method according to claim 3, wherein updating and storing the feature code comprises:
   increasing an original running number by one to generate and store a new feature code.

5. The method according to claim 1, wherein:
   the transmitting terminal device and the receiving terminal device perform wired communication during match authentication.

6. The method according to claim 5, wherein:
   the transmitting terminal device and the receiving terminal device are connected over a Controller Area Network, CAN, communication bus to perform wired communication.

7. The method according to claim 1, further comprising:
   the receiving terminal device using the feature code for authorization authentication with the transmitting terminal device prior to communication; and
   the transmitting terminal device communicating with the receiving terminal device after authorization authentication is passed.

8. The method according to claim 1, wherein:
the transmitting terminal device is a wireless controller, and the receiving terminal device is a wireless receiver.

9. A match authentication method for wireless communication devices, comprising:
receiving a match request message from a wireless controller to a receiver, wherein the match request message carries a feature code;
acquiring, by the receiver, the feature code and using the feature code to perform authorization authentication on the wireless controller; and
receiving, by the receiver, a control command from the wireless controller after authorization authentication is passed, wherein
an initial value of the feature code is pre-stored in the wireless controller, the feature code comprises a serial number and a maintenance running number of the wireless controller, and the serial number of the wireless controller is fixed.

10. The method according to claim 9, wherein:
the match request message further carries a communication parameter which comprises a carrier frequency and/or bite rate of communication, and the wireless controller uses the communication parameter for communication with the receiver.

11. The method according to claim 9, wherein:
an initial value of the feature code is pre-stored in the wireless controller and the feature code comprises a serial number and a maintenance running number of the wireless controller.

12. The method according to claim 11, further comprising:
updating the feature code in the receiver upon reception of the match request transmitted from the wireless controller, and the updated feature code is used in ongoing match authentication; or
updating the feature code in the receiver at the end of each match authentication for use in subsequent matching.

13. The method according to claim 9, wherein:
the wireless controller and the receiver perform wired communication during match authentication.

14. The method according to claim 13, wherein:
the wireless controller and the receiver are connected over a Controller Area Network, CAN, communication bus to perform wired communication.

15. A wireless communication device capable of match authentication, comprising:
a storage unit adapted to store a feature code;
a communication unit adapted to transmit the feature code to an opposite device in response to a request and receive a request or command from the opposite device; and
an authorization authentication unit adapted to use the feature code to perform authentication with the opposite device,
wherein an initial value of the feature code is pre-stored in the receiving terminal device, the feature code comprises a serial number and a maintenance running number of the receiving terminal device, and the serial number of the receiving terminal device is fixed.

16. The wireless communication device according to claim 15, wherein the wireless communication device further comprises:
a feature code updating unit adapted to update the feature code,
wherein the feature code updating unit updates the feature code in the opposite device upon reception of the match request transmitted from the opposite device, and the updated feature code is used in ongoing match authentication; or
the feature code updating unit updates the feature code in the opposite device at the end of each match authentication for use in subsequent matching.

17. The wireless communication device according to claim 15, wherein a CAN bus interface is arranged on the wireless communication device over which the wireless communication device and the opposite device are connected during match authentication.

18. A wireless communication system capable of match authentication, comprising a transmitting terminal device and a receiving terminal device, wherein:
the transmitting terminal device and the receiving terminal device interact to determine a feature code for authorization authentication;
the receiving terminal device uses the feature code for authorization authentication with the transmitting terminal device prior to communication; and
the transmitting terminal device and the receiving terminal device communicate after authorization authentication is passed,
wherein an initial value of the feature code is pre-stored in the receiving terminal device, the feature code comprises a serial number and a maintenance running number of the receiving terminal device, and the serial number of the receiving terminal device is fixed.

19. The wireless communication system according to claim 18, wherein:
the transmitting terminal device transmits a match request to the receiving terminal device;
the transmitting terminal device receives a response message fed back from the receiving terminal device, wherein the response message carries the feature code, and the transmitting terminal device acquires the feature code as an authorization authentication code for communication with the receiving terminal device.

20. The wireless communication system according to claim 18, wherein:
the transmitting terminal device and the receiving terminal device perform wired communication during match authentication.

21. The wireless communication system according to claim 20, wherein:
the transmitting terminal device and the receiving terminal device are connected over a Controller Area Network, CAN, communication bus.

* * * * *